(12) United States Patent
Kime

(10) Patent No.: US 6,422,347 B1
(45) Date of Patent: Jul. 23, 2002

(54) POWER-LOOP APPARATUS AND METHOD

(76) Inventor: Wellesley Rolland Kime, 4804 Laurel Canyon Blvd., #118, Valley Village, CA (US) 91607

( * ) Notice: Subject to any disclaimer, the term of this patent is extended or adjusted under 35 U.S.C. 154(b) by 0 days.

(21) Appl. No.: 09/501,841

(22) Filed: Feb. 10, 2000

Related U.S. Application Data

(60) Provisional application No. 60/119,734, filed on Feb. 12, 1999.

(51) Int. Cl.$^7$ .................................................. F03G 3/00
(52) U.S. Cl. ........................................ 185/32; 185/33
(58) Field of Search .......................... 185/7, 11, 12, 185/32, 33

(56) References Cited

U.S. PATENT DOCUMENTS

| | | | | | |
|---|---|---|---|---|---|
| 366,061 A | * | 7/1887 | Allender | ...................... | 185/32 |
| 680,038 A | * | 8/1901 | Gore | ....................... | 185/33 X |
| 803,832 A | * | 11/1905 | Laird | ........................ | 185/33 |
| 994,101 A | * | 5/1911 | Andres | ...................... | 185/33 |
| 1,083,794 A | * | 1/1914 | Braunsdorf | ............... | 185/30 X |

* cited by examiner

*Primary Examiner*—Allan D. Herrmann

(57) ABSTRACT

A closed loop apparatus for the input, storage, and output of mechanical energy having a closed loop with active and inactive segments, a rotatable power input shaft for shortening the active segment with the input of kinetic energy, a rotatable power output shaft for the output of rotational kinetic energy with the lengthening of the active segment; and having at least one additional rotatable shaft for separating the active segment form the inactive segment so that shortening of the inactive segment does not interfere with lengthening of the active segment enabling all of the stored potential energy to be output as rotational kinetic energy.

4 Claims, 1 Drawing Sheet

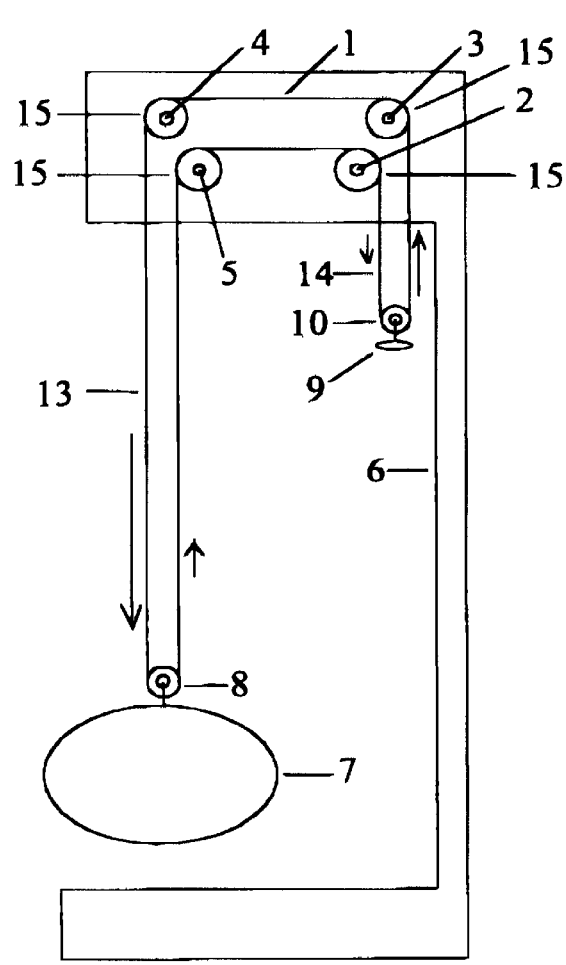
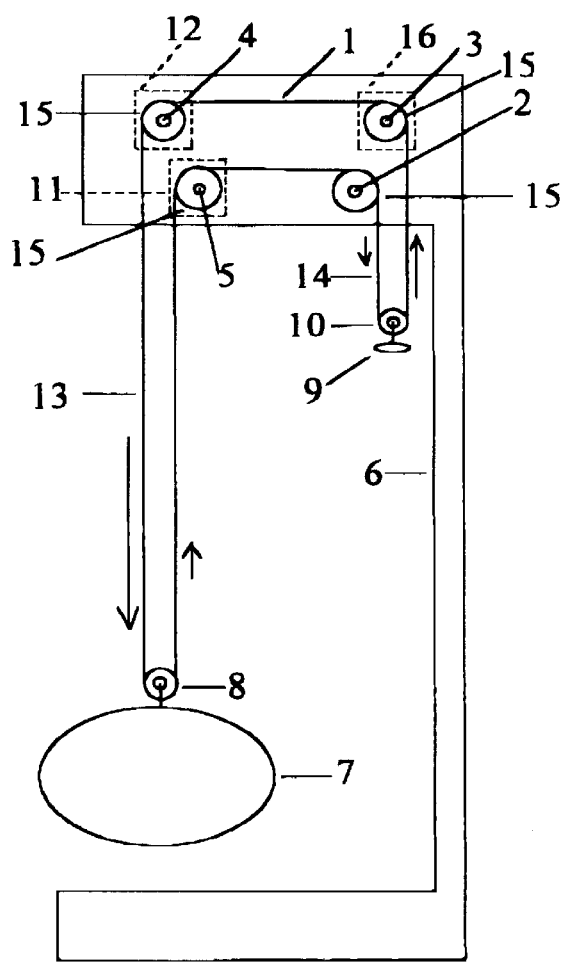
Figure 1
Figure 2

POWER-LOOP APPARATUS AND METHOD

This application claims the benefit of provisional application 60/119,734 filed Feb. 12, 1999.

BACKGROUND OF THE INVENTION

Regular physical exercise is important for physical fitness. Some people do not engage in physical exercise until they are able to expend the energy constructively. In devising an apparatus for constructive physical exercise that would intake, store, and output mechanical energy for the generation of electricity, I invented the Power-Loop. It became apparent that different embodiments of the apparatus could be: made for utilizing all sources of mechanical energy such as for example tidal energy, wave energy, solar energy, wind energy, the weight of animals walking, and any combination of sources of mechanical energy, for the generation of electricity.

The Tide Motor, patented Jan. 6, 1914, by W. Braundsdrop showed a closed loop apparatus for the input, storage, and output of energy generated by the rising and lowering of the tide. My apparatus differs from this and all other prior art in that the lengthening of the active segment in my invention is not limited by the shortening of the inactive segment because these two segments have different paths. In the prior art, the active and inactive segments of the closed loop have a common path so that the lengthening of the active segment is limited by the shortening of the inactive segment. Comparing my invention with devices having closed loops of equal size using the prior art, with my invention essentially all of the stored potential energy can be released as rotational energy whereas with the prior art only about half of the stored potential energy can be released as rotational energy.

BRIEF SUMMARY OF THE INVENTION

The "Power-Loop" apparatus is a zero-emission, non-polluting closed loop apparatus for the concurrent and intermittent input of mechanical energy, the indefinite storage of potential energy, the output of a continuous flow of kinetic mechanical energy when desired, and the output of essentially all of the stored potential energy as kinetic mechanical energy.

The Power-Loop can be constructed in various embodiments and in any suitable size so that any source or combination of sources of mechanical energy can be input into the apparatus; and the output can be used for any suitable purposes such as for the generation of electricity.

The Power-Loop method comprises the use of an apparatus having a closed loop in combination with using at least one of the following: means for storing potential energy indefinitely; means for the output of a continuous flow of kinetic mechanical energy; means for the output of kinetic mechanical energy when desired; and means for the output of essentially all of the stored potential energy as kinetic mechanical energy.

BRIEF DESCRIPTION OF THE SEVERAL VIEWS OF THE DRAWING

FIGS. 1 and 2, are schematic representations of an example of a closed loop configuration that may be used in my Power-Loop apparatus. The path of the shortening and lengthening of the active segment of the closed loop is separate from the path of the shortening and lengthening of the inactive segment so that shortening of the inactive segment does not at any time interfere with the complete lengthening of the active segment thus enabling essentially all off the stored potential energy to be output as kinetic mechanical energy. Increasing the length of the active and inactive segments of the closed loop will increase the amount of potential energy that can be stored in the active segment of the closed loop.

FIG. 2 shows the same closed loop configuration of FIG. 1, with the addition of schematic representations of control means discussed below.

DETAILED DESCRIPTION OF THE INVENTION

The small arrow next to the closed loop indicates the direction the closed loop moves when the power input shaft is rotated so as to shorten the active segment for the input kinetic mechanical energy, and the long arrow next to the closed loop indicates the direction the closed loop is moved by rotation of the power output shaft for the output of kinetic mechanical energy and the lengthening of the active portion of the closed loop.

In the drawings the power input shaft is rotated in a clockwise direction and power output shaft is rotated in a counterclockwise direction. This is by way of example only and could have been drawn in the reverse.

FIGS. 1 and 2 are front view diagrammatic representations of an example of a closed loop configuration that may be used in my Power-Loop Apparatus. Closed loop 1 is a drive chain that in supported by four shafts 2, 3, 4, and 5, that are rotatably secured to framework 6. These shafts have attached sprockets 15. Shaft 2 is a kinetic mechanical energy input shaft (power input shaft); shaft 3 is a kinetic mechanical energy output shaft (power output shaft), shaft 4 is a speed control shaft for controlling the rate of continuous output flow of kinetic mechanical energy, and shaft 5 is a one way rotational shaft for preventing power input shaft 2 from rotating in a counter clockwise direction when sufficient kinetic mechanical energy is not being applied to kinetic mechanical energy input shaft 2 to prevent counter clockwise rotation. The sprockets have teeth, not shown, that mesh with the drive chain 1 to prevent slippage of the closed loop on any of the shafts. Closed loop 1 is separated into an active segment 13 and an inactive segment 14 by power input shaft 2 and power output shaft 3. The active segment 13 of closed loop 1 is under tension of major weight 7 via pulley mechanism 8, known to the art, so ad to urge the power output shaft 3 to rotate in a counter clockwise direction and output mechanical energy and lengthen the active segment 13 of the closed loop. Inactive segment 14 shortens as active segment 13 lengthens, and conversely. Minor tension is placed on inactive segment 14 of closed loop 1 by minor weight 9 via pulley mechanism 10, known to the art. The purpose of the minor weight is to prevent tangling of inactive segment 14.

Referring to FIG. 2: This drawing has the same closed loop configuration that is used in FIG. 1, and additionally has schematic representations of the control devices 11, 12, and 16. Control device 16 comprises switching means known to the art, that is secured to power output shaft 3 and to the framework 6 so that potential energy will not be output as kinetic mechanical energy until desired. Activating the said switching means enables power output shaft 3 to rotate in a counter clockwise direction. Any suitable switching means known to the art may be used for this purpose.

Control Device 12, comprises a governor speed device control known to the art, that is secured to framework 6 and rotatably secured to speed control shaft 4, for controlling the rate of flow of continuous output of kinetic mechanical energy. Control Device 12 controls the rotational speed of shaft 4 and thereby controls the speed of movement of closed loop 1 between shafts 4 and 3, thereby controlling the rotational speed of energy output shaft 3. Alternatively, Control Device 12 can be secured to output shaft 3 rather than shaft 4. Any suitable rotational speed control means known to the art may be substituted for a governor speed control device.

Control Device 11 comprises a one way ratchet, known to the art, that is secured to one way shaft 5 for preventing shaft 5 from rotating in a counter clockwise direction so as to prevent the loss of kinetic mechanical energy when sufficient clockwise rotational energy is not being applied to input shaft 2 to prevent lengthening of active segment 13.

Any number of shafts may be used to support the closed loop provided the closed loop is configured so that shortening of the passive portion does not interfere with complete lengthening of the active portion.

If the closed loop is comprised of a cable or rope, the cable or rope is wrapped at least once around the shaft or a sheave secured to the shaft and the passive segment of the closed loop is placed under sufficient tension to prevent slippage. Means may be used to prevent "crawling" and "binding" of the rope or cable on the shaft or sheave, such as for example placing the rope or cable through a pulley attached to the framework so that the rope or cable is continually fed onto the shaft or sheave at the same location.

Any suitable means of applying tension to the active and passive portions of the closed loop may be used as for example spring means, gas under pressure means, and liquid under pressure means, so that the Power-Loop may be used in outer space where gravitational force is not available. The minor weight is to prevent tangling of the passive segment. The minor weight may be eliminated. A linear connecting means having a limit spring known to the art may be secured to pulley 8 and major weight 7. Tension may be applied to the linear connecting means by passing it through pulleys attached to the base of the framework. The limit spring known to the art provides some extension by compressing the spring but prevents excessive extension so as to prevent excessive sway of the active and passive segments of the closed loop. Any suitable means may be used to limit sway of the active and passive portions of the closed loop.

The active portion of the closed loop may have multiple sections under tension, each supported by rotatable support means, and the passive portion may have multiple sections under minor tension, each supported by rotatably support means.

More than one continuous loop may be used and they may be used in series or in parallel.

The Power-Loop may incorporate any and all means known to the art for any purpose as for example changing mechanical advantages, (such as for example gearing means and leverage means); switching means such as for example mechanical, electrical, magnetic and electronic switching means; braking means; means for converting bi-directional reciprocating forces (reciprocating movements which have usable force in two directions) and unidirectional reciprocating forces (reciprocal forces that have usable forces in one direction) into unidirectional rotational force; means for converting bi-directional rotational forces into unidirectional rotational forces; means for preventing the rotation of a shaft in one rotational direction; means for preventing the rotation of a shaft in either rotational direction; automated switching means such as for example voltage control switching means and other sensor controlled switching means; electricity storage means; electricity generating means; electric motor means; means for converting direct current into alternating current; means for converting alternating current to direct current; means for controlling the cycle speed of alternating current; means for transporting mechanical energy such as for example transmission means; fluid pumping means; hydraulic motor means and hydraulic pump means; means for converting downward gravitational forces (as for example the downward gravitational forces produced by walking animals, any force produced by ocean waves, ocean tides, streams, rivers, and falling water) into rotational energy; means for converting flotation energy (as for example flotation energy derived from ocean tidal movements and ocean wave) into rotational energy; means for converting wind energy into rotational energy; means for converting wave energy (such as for example ocean wave energy) into bi-directional reciprocating movements; means for converting electrical energy in nature (such as for example lightening energy) into rotational energy; means for converting heat energy into rotational energy; means for converting heat differential energy into rotational energy: means for converting gas expansion energy into rotational energy; means for converting gas contraction energy into rotational energy; and means for converting human exercise movements into rotational movements.

What is claimed is:

1. I claim an apparatus comprising at least one closed loop having an active segment for the input of kinetic energy, storage of potential energy, and output of kinetic energy, a rotatable paver input shaft for shortening the active segment with the input of kinetic energy; a rotatable power output shaft for the output of kinetic energy with the lengthening of the active segment, and an inactive segment that shortens as the active segment lengthens and lengthens as the active segment shortens, additionally comprising:

a) means for separating the active segment from the inactive segment so that shortening of the inactive segment does not interfere with lengthening of the active segment thereby enabling all of the stored potential energy to be output as kinetic energy.

2. I claim the apparatus set forth in claim 1, wherein the means for separating the active segment from the inactive segment comprises at least one additional rotatable shaft.

3. I claim a method for the input of kinetic energy, storage of potential energy, and output of kinetic energy utilizing an apparatus comprising of at least one closed loop having an active segment that shortens with the input of kinetic energy, that stores potential energy, and that lengthens with the output of kinetic energy, an inactive segment that lengthens as the active segment shortens and shortens as the active segment lengthens a rotatable power input shaft for the input of kinetic energy by shortening the active segment, a rotatable power output shaft for the output of rotational kinetic energy with the lengthening of the active segment, and additionally comprising:

a) means for separating the active segment from the inactive segment so that shortening of the inactive segment does not interfere with the lengthening of the active segment.

4. I claim the method set forth in claim 3, wherein the means for separating the active segment from the inactive segment comprises at least one additional rotatable shaft.

* * * * *